(12) United States Patent
Melideo (10) Patent No.: US 7,103,010 B2
(45) Date of Patent: Sep. 5, 2006

(54) APPLICATION INDEPENDENT TELEPHONE CALL INITIATION

(75) Inventor: John Melideo, Westlake Village, CA (US)

(73) Assignee: JamboTECH, LLC, Agoura Hills, CA (US)

( * ) Notice: Subject to any disclaimer, the term of this patent is extended or adjusted under 35 U.S.C. 154(b) by 209 days.

(21) Appl. No.: 10/691,982

(22) Filed: Oct. 22, 2003

(65) Prior Publication Data

US 2004/0258048 A1 Dec. 23, 2004

Related U.S. Application Data

(60) Provisional application No. 60/471,535, filed on May 19, 2003.

(51) Int. Cl.
*H01Q 11/00* (2006.01)
*H04L 12/50* (2006.01)

(52) U.S. Cl. .................. 370/260; 370/261; 370/352; 370/360

(58) Field of Classification Search .......... 370/352, 370/401, 260, 261, 360
See application file for complete search history.

(56) References Cited

U.S. PATENT DOCUMENTS

| | | | |
|---|---|---|---|
| 5,483,352 A | 1/1996 | Fukuyama | |
| 5,790,638 A | 8/1998 | Bertacchi | |
| 6,115,461 A | 9/2000 | Baiyor | |
| 6,144,667 A | 11/2000 | Doshi | |
| 6,185,194 B1 | 2/2001 | Musk | |
| 6,249,576 B1 | 6/2001 | Sassin | |
| 6,307,853 B1 | 10/2001 | Storch | |
| 6,317,781 B1 | 11/2001 | De Boor | |
| 6,385,191 B1 | 5/2002 | Coffman | |
| 6,445,468 B1 | 9/2002 | Tsai | |
| 6,470,079 B1 | 10/2002 | Benson | |
| 6,473,423 B1 | 10/2002 | Tebeka | |
| 6,570,964 B1 | 5/2003 | Murveit et al. | |
| 6,600,503 B1 | 7/2003 | Stautner | |
| 6,606,305 B1 * | 8/2003 | Boyle et al. ................ | 370/260 |
| 6,665,375 B1 * | 12/2003 | Forlenza et al. ............... | 379/52 |
| 6,670,968 B1 | 12/2003 | Schilit | |
| 6,690,672 B1 | 2/2004 | Klein | |
| 6,731,630 B1 * | 5/2004 | Schuster et al. ............ | 370/356 |
| 6,834,048 B1 | 12/2004 | Cho | |
| 6,870,828 B1 * | 3/2005 | Giordano, III .............. | 370/352 |
| 7,006,455 B1 * | 2/2006 | Fandrianto et al. ......... | 370/260 |

(Continued)

FOREIGN PATENT DOCUMENTS

WO WO00/05679 2/2000

OTHER PUBLICATIONS

C. J. Weigand, Indispensible software on-line, Home Office Computing, Apr. 1992, v10 n4 p. 20.

*Primary Examiner*—Hassan Kizou
*Assistant Examiner*—Jay P. Patel
(74) *Attorney, Agent, or Firm*—SoCal IP Law Group LLP; Steven C. Sereboff; Mark Andrew Goldstein (57) ABSTRACT

There are disclosed methods and apparatus for telephone call initiation. An application program causes a telephone number to be displayed. A user activates the displayed telephone number. A telephone call module recognizes the activation of the displayed telephone number, and causes a signal to be sent to a switch instructing the switch to initiate a telephone call between a predefined telephone number and the displayed telephone number.

48 Claims, 5 Drawing Sheets

U.S. PATENT DOCUMENTS

| | | | |
|---|---|---|---|
| 2001/0038624 A1* | 11/2001 | Greenberg et al. | 370/352 |
| 2001/0055299 A1* | 12/2001 | Kelly | 370/352 |
| 2002/0064149 A1* | 5/2002 | Elliot et al. | 370/352 |
| 2002/0118671 A1* | 8/2002 | Staples et al. | 370/352 |
| 2002/0128036 A1* | 9/2002 | Yach et al. | 455/552 |
| 2003/0063590 A1* | 4/2003 | Mohan et al. | 370/338 |
| 2003/0147381 A1* | 8/2003 | Nelson et al. | 370/352 |
| 2004/0057417 A1* | 3/2004 | Burritt | 370/352 |
| 2004/0202150 A1* | 10/2004 | Lin et al. | 370/352 |
| 2004/0246846 A1* | 12/2004 | Takahashi et al. | 369/53.2 |
| 2004/0246946 A1* | 12/2004 | Nelson et al. | 370/352 |

* cited by examiner

APPLICATION INDEPENDENT TELEPHONE CALL INITIATION

RELATED APPLICATION INFORMATION

This application claims priority from Application No. 60/471,535 filed May 19, 2003, which is incorporated herein by reference. This application is related to application Ser. No. 10/614,394 filed Jul. 3, 2003 entitled "Rendering Telephone Numbers as Objects" which is incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure as it appears in the Patent and Trademark Office patent files or records, but otherwise reserves all copyright and trade dress rights whatsoever.

BACKGROUND OF THE INVENTION

1. Field of the Invention

The present invention relates to initiation of telephone calls from a client computer on a network.

2. Description of Related Art

A graphical user interface or GUI is a graphical representation or presentation of information. Various options that provide the user with the ability to manipulate information and data may be presented in a GUI that may consist of a window or menu. For example, customer information such as a customer name, contact name, address, and zip code may be presented to a user in a visually appealing manner such that the words "Customer Name" appear next to a text field box with a space for a name, the words "Contact Name" appear next to a text field box with a space for a name, the word "Address" appears next to a text field box with a space for an address, and the words "Zip Code" appear next to a text field box with a space for a zip code. The field names (i.e., Customer Name, Contact Name, Address, and Zip Code) may be displayed in a specific font or color with the text field boxes (or the information in the text field boxes) in the same or different font or color. Thus, the GUI provides for the display of the information.

Commonly, a GUI representation of information is displayed in a window with several standard components that are displayed regardless of the type, style, or content of the information to be displayed by the GUI. A display may be contained within a frame. The top of the window may have a title bar for which a title may be specified. Below title bar may be a menu bar. The menu bar may be associated with various capabilities. The menu bar may have various submenus. Each submenu may be a menu itself or a command that can be selected by the user.

A "web browser" is an application program used for viewing HTTP (web) files and navigating through linked web files. The web files may include hyperlinks which, when activated by the user cause a corresponding web page to be displayed. Hyperlinks may also cause other events, such as the launching of programs or routines (e.g., causing a blank email message to be opened with a predefined address).

Efforts have been made in integrating the Web with telephony applications. One such popular application is the placing of telephone calls from PC to a regular telephone. A user can place a call to a regular telephone from the Web using Dialpad (Dialpad Communications, Inc.) or Net2Phone (Net2Phone, Inc.). In these applications, a user must manually enter a telephone number each time he wishes to initiate a call, or pick a telephone number from a structured list stored by and only available from the dialing application. In view of the success of such products and services, one could conclude that the users were satisfied and there has been no motivation to seek other solutions.

Some companies, in conjunction with their sales and customer-support efforts, have added a "call me" or "call-back" function to their web sites. With these functions, a user who browses to the company's web site may then manually enter his own telephone number and other information into a web page. The company's computers then initiate the call back to the user.

DETAILED DESCRIPTION OF THE INVENTION

Throughout this description, the embodiments and examples shown should be considered as exemplars, rather than limitations on the apparatus and methods of the present invention.

Description of the System

Figure 1:
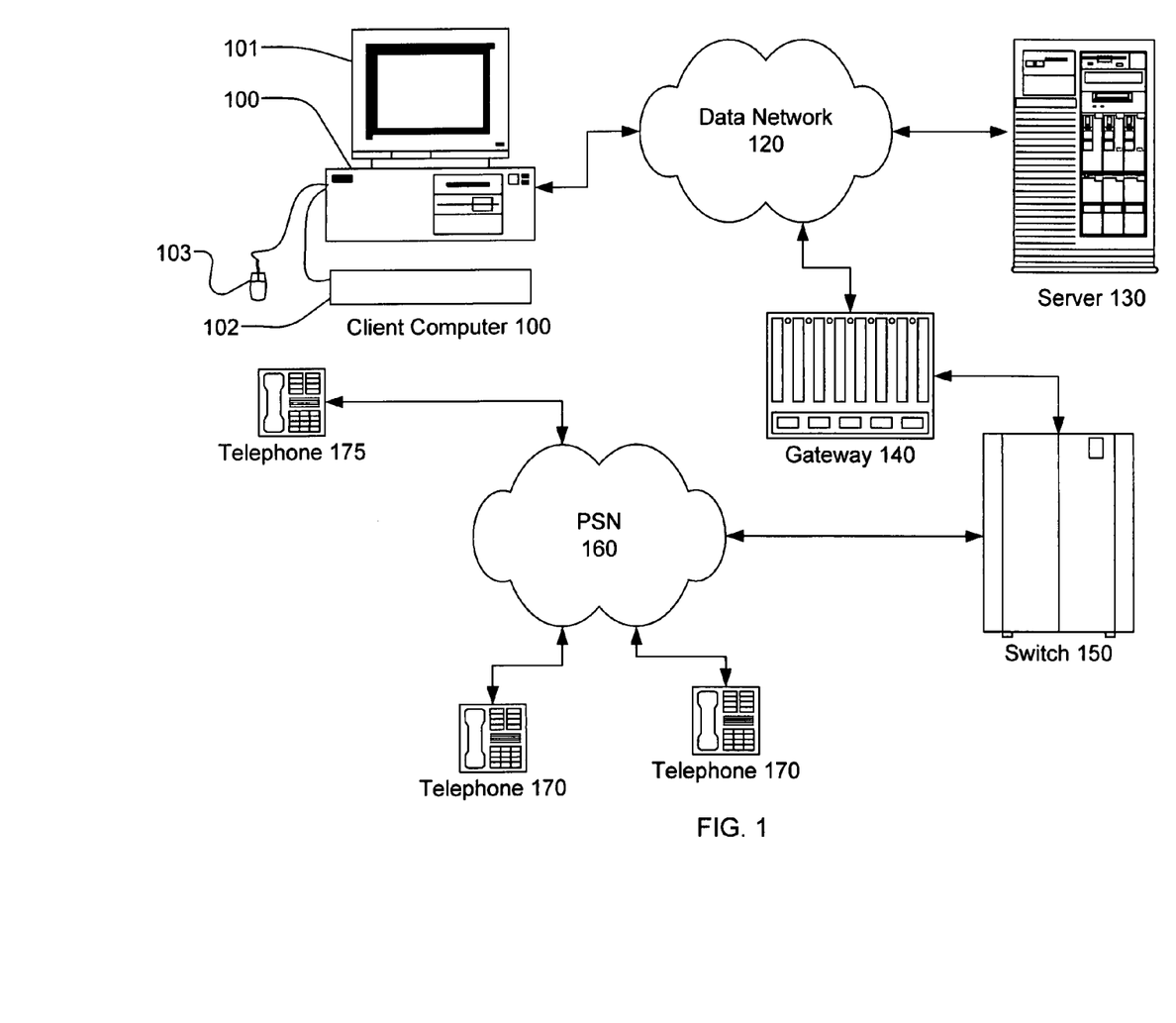
FIG. 1 is a block diagram of an environment in accordance with the invention.

Referring now to FIG. 1, there is shown a block diagram of an environment in accordance with the invention. The system includes a client computer 100, a data network 120, a server 130, a gateway 140, a switch 150, a public switched network (PSN) 160 and plural telephones 170.

The client computer 100 may comprise a general purpose computer. The client computer 100 may be, for example, a PC running a Microsoft Windows operating system. The client computer 100 may include an output device, such as a display 101, and an input device, such as a keyboard 102 and/or a pointing device 103 (e.g., mouse, track ball, light pen, or data glove). The client computer 100 may be a computing device such as a workstation, server, portable computer, personal digital assistant (PDA), computing tablet, two-way messaging devices (e.g., Blackberry™), smart display terminal, and the like. The client computer 100 connects with and communicates on the data network 120 and includes an interface therefore. The client computer 100 may comprise an assembly of devices, such as a television and a set-top box which interfaces to the data network 120.

The client computer 100 and the server 130 may include software and/or hardware for providing the functionality and features of the invention. The client computer 100 and the server 130 may therefore include one or more of: logic arrays, memories, analog circuits, digital circuits, software, firmware, and processors such as microprocessors, field programmable gate arrays (FPGAs), application specific integrated circuits (ASICs), programmable logic devices (PLDs) and programmable logic arrays (PLAs). The hardware and firmware components of the client computer 100 and the server 130 may include various specialized units, circuits, software and interfaces for providing the functionality and features of the invention. The invention may be embodied in whole or in part in software which operates on the client computer 100 and the server 130 and may be in the form of an application program, an applet (e.g., a Java applet), a browser plug-in, a COM object, a dynamic linked library (DLL), a script, one or more subroutines, an operating system component or service, or a terminate and stay resident program (TSR). The hardware and software of the invention and its functions may be distributed such that some components are performed by the client computer 100, the server 130 and others by other devices.

The data network 120 provides lower layer network support for the client computer 100 to interact with other devices, including the server 130 and the gateway 140. The data network 120 is packet-switched and may comprise a common or private bi-directional data network, and may be, for example the Internet or utilize the IP protocol.

The server 130 may be a web server having the ability to serve web pages to the client computer 100, as requested. It should be appreciated that the server 130 is representative of any source of web pages available to the client computer 100. Thus, for example, the server 130 could be accessible from the Internet, or it could be a part of an intranet and represents any number of web servers.

The PSN 160 is a common carrier network which provides circuit switching and/or IP telephony between public users. The PSN 160 may be the public switched telephone network (PSTN). The PSN 160 may operate according to standards such as SS6 or SS7.

The telephones 170 may be ordinary analog telephones connected to the PSN. The telephones 170 may be digital devices (e.g., SIP devices or telephone sets connected through a PBX) for providing voice communications. The telephones 170 may also be wireless voice communications devices such as cell phones. There may be one or more telephones 175 located proximate the client computer 100, or in a location under common control of the user of the client computer 100. The telephone 175 is of the same type as the telephones 170.

The switch 150 may be a voice switch, circuit switch and/or an IP switch and may be compliant with standards such as SS6 or SS7. The switch 150 is compatible with the PSN 160, and has the ability to set up and tear down telephone connections in the PSN 160.

The gateway 140 interfaces between the packet-switched data network 120 and the switch 150. The gateway 140 may be a signaling gateway platform (SGP), which is an intelligent service exchange node that integrates services between circuit and packet networks. The gateway 140 may be integrated into the PSN 160 or the switch 150.

The telephones 170 may be ordinary analog telephones connected to the PSN. The telephones 170 may be digital devices (e.g., SIP devices or telephone sets connected through a PBX) for providing voice communications. The telephones 170 may also be wireless voice communications devices such as cell phones. There may be one or more telephones 175 located proximate to the client computer 100, or in a location under common control of the user of the client computer 100. The telephone 175 is of the same type as the telephones 170.

Figure 2:
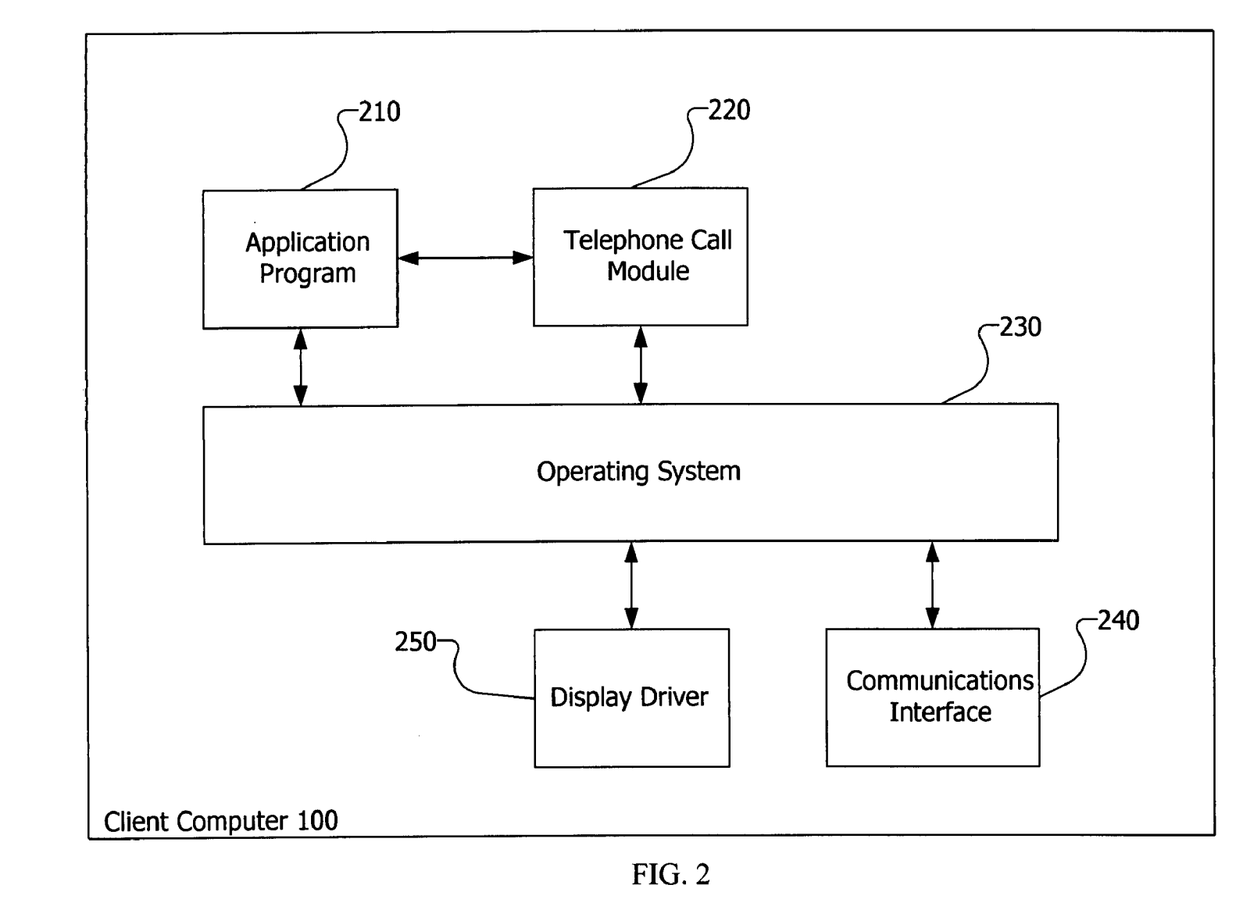
FIG. 2 is a block diagram of a client computer in accordance with a first aspect of the invention.

The local application program 210 is a self-contained integrated body of computer software disposed at the topmost layer of the OSI Reference Model (i.e., the application layer) that runs in "user mode," calls services of the operating system 230 and performs work directly for the user. The local application program 210 may be stand-alone, network-based or part of an integrated package. The local application program 210 may comprise one or more files, modules or other parts. The local application program 210 may be, for example, a spreadsheet, word processor, graphics editor, database program, email client, web browser, or contact manager.

In the ordinary course of its operation, the local application program 210 displays a telephone number. Alternatively, the local application program 210 may display some other item which is associated with a telephone number. This alternative is useful, for example, for databases which have objects such as peoples' names associated with a telephone number. These objects are not telephone numbers or like telephone numbers, but because of their intended usage they are associated with a telephone number. For convenience, these objects will be referred to as "name objects."

The term "name objects" is not limited to names, though. For example, contact management databases typically store records comprising a contact's name and one or more telephone numbers for the contact. In such a case, it may be desirable to provide streamlined activation of the associated telephone number if the user activates a display of the contact's name. In this example, the contact's name is a name object.

This association of the name object with a telephone number may be through a "phone number object." The phone number object may include one or more telephone numbers. For example, each telephone number in a data unit may correspond to a single object. Alternatively, each data unit may have a single phone number object for all of its telephone numbers. Alternatively, there may be a single phone number object for all telephone numbers identified by the client computer 100, or for all telephone numbers for a given application program. Other alternatives may be within the scope of the invention.

By "data unit," it is meant a defined group of data. The data unit may be of a type which can include a telephone number which is displayable on the display 101 and thereby viewable by a human. The data unit may consist only of contiguous text (e.g., an ASCII text file), or may consist of a mixture of displayable and non-displayable data (e.g., a word processing document). The data unit may be a file or may be part of a file. The data unit may comprise a number of objects (e.g., contact information used in a contact management program). The text in the data unit may be encoded, such as in ASCII. The data unit may be, for example, an email message, an instant message (IM), a spreadsheet, a web page, a record in a contact management database, a or word processing document.

The phone number object may include the telephone number and/or may include a reference to the telephone number within the data unit. The phone number object is defined such that the telephone number is activatable as described herein.

Although the phone number object may be considered as an "object" in the sense of object-oriented programming, the phone number object may transcend the limitations of object-oriented programming. Thus, the phone number object may represent, for example, a flag in a data structure which is used to indicate performance of a separate subroutine. The phone number object may be viewed as including "hooks" for allowing initiation of telephone calls using the corresponding telephone number. The phone number object therefore is a shorthand for an attachment between a displayed telephone number and telephone call initiation functions.

The telephone call module 220 may itself be or include an application program like the local application program 210. Alternatively, the telephone call module 220 may be, for example, an applet (e.g., a Java applet), a browser plug-in, a COM object, a dynamic linked library (DLL), a script, one or more subroutines, an operating system component or service, or a terminate and stay resident program (TSR). The telephone call module 220 may be stand-alone, network-based or part of an integrated package. The telephone call module 220 may comprise one or more files, modules or other parts. The telephone call module 220 may comprise software distinct from the local application program 210 and may operate apart from the local application program 210.

The operating system 230 is the software that runs the client computer 100. The operating system 230 deals with the client computer's hardware, provides an environment and an interface for users, carries out (executes) user commands and program instructions, and provides input and output, memory and storage, file and directory management capabilities. The operating system 230 provides services to the local application program 210 and the telephone call module 220, and also provides an interface between higher level entities (e.g., the local application program 210 and the telephone call module 220) to lower level entities (e.g., the display driver and the communications interface 230).

The communications interface 240 may be a network interface, such as a NIC. The communications interface 240 may include hardware and software and may include a TCP/IP stack. The communications interface 240 serves as a common interface for hardware and software of the client computer 100 to allow them to communicate with the data network 120.

The display driver 250 controls the display 101. The display driver 250 provides an interface between software of the client computer 100 (e.g., the operating system 230, the local application program 210 and the telephone call module 220) and the display. The display driver 250 may be integrated with the operating system 230.

Figure 4:
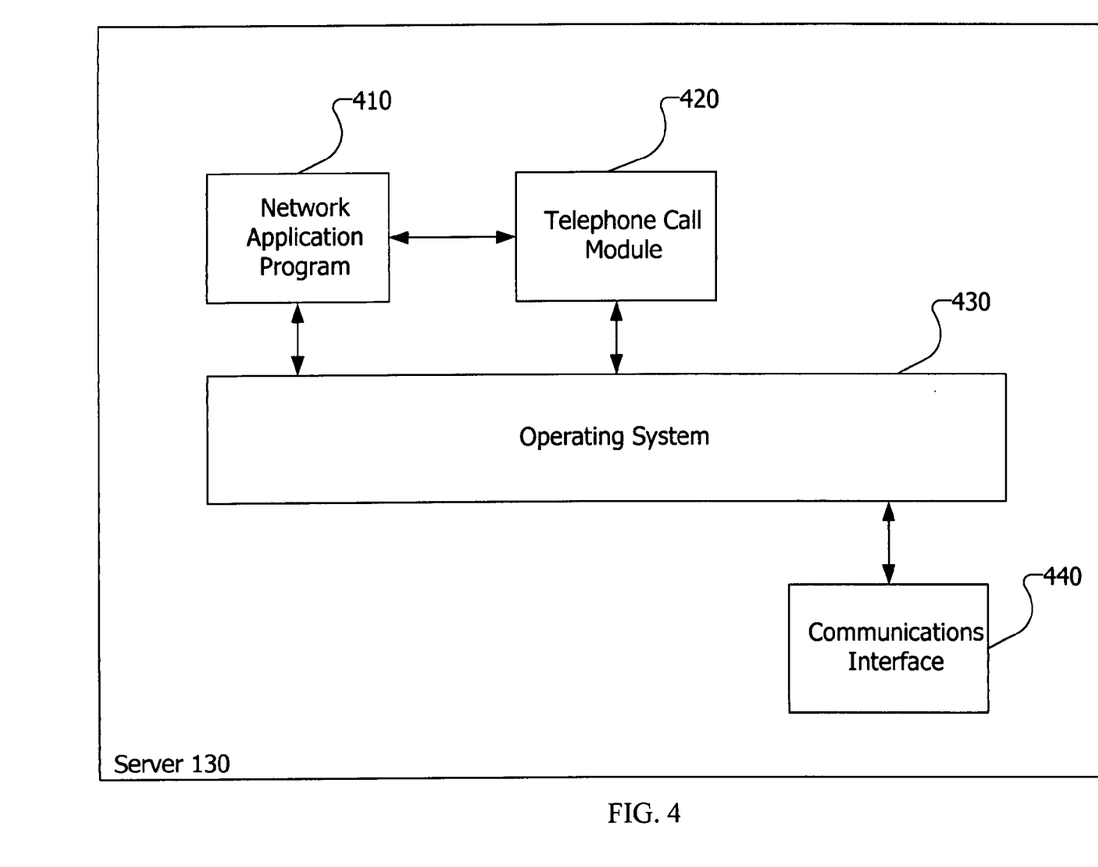
FIG. 4 is a block diagram of a server in accordance with a second aspect of the invention.

Referring now to FIG. 4, there is shown a block diagram of the server 130. The server 130 includes a network application program 410, a telephone call module 420, an operating system 430 and a communications interface 440. The server 130 may include more than one each of these components 410, 420, 430, 440, though only one of each is described herein. For example, where the server 130 may support many network application programs.

The network application program 410 is a self-contained body of computer software disposed at the topmost layer of the OSI Reference Model (i.e., the application layer) that calls services of the operating system 430 and performs work at the request of client computers on the network. The network application program 410 may be stand-alone, distributed or part of an integrated package. The network application program 410 may comprise one or more files, modules or other parts. The network application program 410 may be, for example, a web site, an electronic mail server or an FTP server.

In the ordinary course of its operation, the network application program 410 sends messages to the client computer 100 for causing the client computer 100 to display a telephone number. Alternatively, the network application program 410 may send messages to the client computer 100 for causing the client computer 100 to display some other item which is associated with a telephone number. The client computer 100 may access the network application program 410 using a browser, and the browser may receive and interpret the messages from the network application program 410.

The telephone call module 420 may itself be or include a network application program like network application program 410. Alternatively, the telephone call module 420 may be, for example, an applet (e.g., a Java applet), a plug-in, a COM object, a dynamic linked library (DLL), a script, one or more subroutines, an operating system component or service, or a terminate and stay resident program (TSR). The telephone call module 420 may be stand-alone, distributed, or part of an integrated package. The telephone call module 420 may comprise one or more files, modules or other parts. The telephone call module 420 may comprise software distinct from the network application program 410 and may operate apart from the network application program 410.

The operating system 430 is the software that runs the server 130. The operating system 430 deals with the server's hardware, provides an environment and an interface for application programs, carries out (executes) commands and program instructions, and provides input and output, memory and storage, file and directory management capabilities. The operating system 430 provides services to the network application program 410 and the telephone call module 420, and also provides an interface between higher level entities (e.g., the network application program 410 and the telephone call module 420) to lower level entities (e.g., the display driver and the communications interface 430).

The communications interface 440 may be a network interface, such as a NIC. The communications interface 440 may include hardware and software and may include a TCP/IP stack. The communications interface 440 serves as a common interface for hardware and software of the server 130 to allow them to communicate with the data network 120.

Description of the Methods

Figure 3:
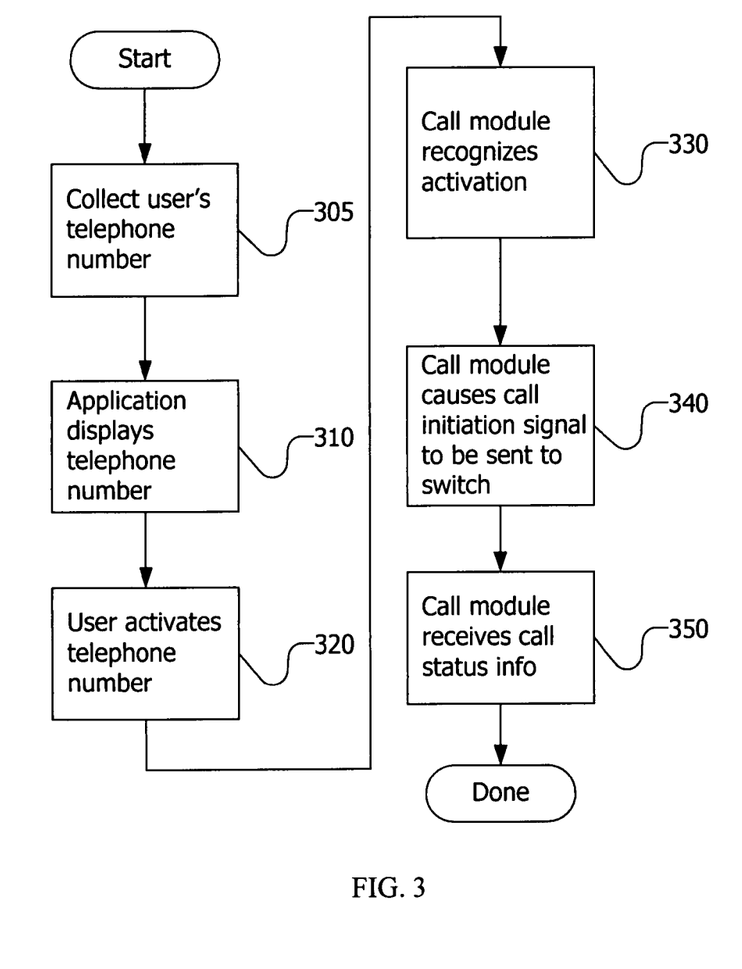
FIG. 3 is a flow chart of a method of application independent telephone call initiation using an object associated with a telephone number in accordance with the first aspect of the invention.

Referring now to FIG. 3, there is shown a flow chart of a method of application independent telephone call initiation by the client computer 100.

In a preliminary step, the telephone call module 220 may collect a user's telephone number and service or billing authentication information (step 305). The telephone number and service or billing authentication information may be collected separately. The user may select any telephone number he wishes, such as the telephone 175 adjacent the client computer 100, a mobile telephone, a remote telephone or otherwise. This selected telephone number may be considered "predefined."

In a first step, the local application program 210 causes a telephone number or a name object to be displayed on the display 101 (step 310). The local application program 210 may do this, for example, by calling a service of the operating system 230 or by working directly with the display driver 250.

Next, a user uses the input device 103 to activate the displayed telephone number or name object (step 320). The user may activate the displayed telephone number or name object in many different ways. For example, the user may use a mouse to click on the displayed telephone number or name object. Alternatively, the user may use his mouse to right-click on the displayed telephone number or name object to thereby display a context-sensitive menu, from which the user clicks on an activation option. Alternatively, there may be an icon on a tool bar which the user can click on. The tool bar may be in a display of the local application program 210 or the telephone call module 220. Alternatively, there may be a menu item in the local application program 210 or the telephone call module 220 for activating the displayed telephone number. Alternatively, there may be a dedicated or shared input device, such as a button on the client computer 100, for activating the displayed telephone number or name object. Alternatively, other input devices may be used.

The telephone call module 220 recognizes the activation of the displayed telephone number or name object (step 330). The tem "activated telephone number" will be used to refer to the activated, displayed telephone number or the telephone number associated with the activated displayed name object. Where activation is performed directly through the telephone call module 220, recognition may be inherent to the telephone call module 220. Alternatively, the telephone call module 220 may monitor the local application program 210 and/or the operating system 240 for activation of a phone number object.

In a preliminary step, the telephone call module 220 may collect a user's telephone number and service or billing authentication information (step 305). The telephone number and service or billing authentication information may be collected separately. The user may select any telephone number he wishes, such as the telephone 175 adjacent to the client computer 100, a mobile telephone, a remote telephone or otherwise. This selected telephone number may be considered "predefined."

The telephone call may connect the user's telephone 175 and one or more other telephones 170 via the PSN 160. The telephone call module 220 may initiate the call, for example, by calling a service of the operating system 230 or by working directly with the communications interface 240.

The telephone call module 220 sends a call initiation message for call initiation. The call initiation message may be an IP-based message for triggering call initiation. The telephone call module 220 may send the call initiation message directly to the switch 150, in which case the call initiation signal is the call initiation message. Alternatively, the telephone call module 220 may send the call initiation message to some other device (e.g., the server 130), which device then causes the call initiation signal to be sent to the switch 150.

The telephone call module 220 recognizes the activation of the displayed telephone number or name object (step 330). The term "activated telephone number" will be used to refer to the activated, displayed telephone number or the telephone number associated with the activated displayed name object. Where activation is performed directly through the telephone call module 220, recognition may be inherent to the telephone call module 220. Alternatively, the telephone call module 220 may monitor the local application program 210 and/or the operating system 240 for activation of a phone number object.

In an embodiment where the call initiation message is sent to the server 130, the server 130 receives the call initiation message and may then transmit the call initiation signal to the switch 150 to trigger the call. The server 130 therefore may play an intermediary role. In this embodiment, a dedicated TCP connection may be opened to authenticate the user and start a call session with the server 130. Using a messaging protocol, the server 130 communicates the call requests to the switch 150 or the gateway 140 to initiate the call. The TCP connection may be kept open during the entire period of the call before it is disconnected. Asynchronous call status messages may be processed as they arrive.

The call initiation message may be one or more HTTP requests. The HTTP requests may be used, for example, to authenticate the user and start a call session with the server 130. The server 130 may communicate these requests to the switch 150 or the gateway 140 to initiate the call. The server 130 may poll the telephone call module 220 at pre-defined intervals for call status requests.

Alternatively, the telephone call module 220 may imitate the telephone call using SIP to send the call initiation message on the data network 120. With this alternative, a telephone on a VoIP network may be bridged with another telephone on the VoIP network or a telephone 170 on the PSN 160.

The method of the invention may be used for initiating two-party calls and conference calls. Thus, where the user desires to have a conference call, the user uses the input device to activate one or more additional telephone numbers. The telephone call module 220 recognizes the activation of the additional telephone numbers and signals the switch 150 to initiate a conference call. There may be a separate signal for each telephone number, or the signals may be joined in a single message to the switch 150.

After the telephone call module 220 has signaled for call initiation, the telephone call module 220 may receive call status information from the switch 150 (step 350). The call status information may be, for example, "connected," "dropped," "busy" and "closed." The switch 150 may send the call status information directly to the telephone call module 220, or the telephone call module 220 may receive the call status information indirectly. The telephone call module 220 may cause the call status information to be provided to the user. For example, the telephone call module 220 may cause the call status information to be displayed on the display 101.

The telephone call module 220 may maintain a log of events. The call status information may be stored in the log.

Figure 5:
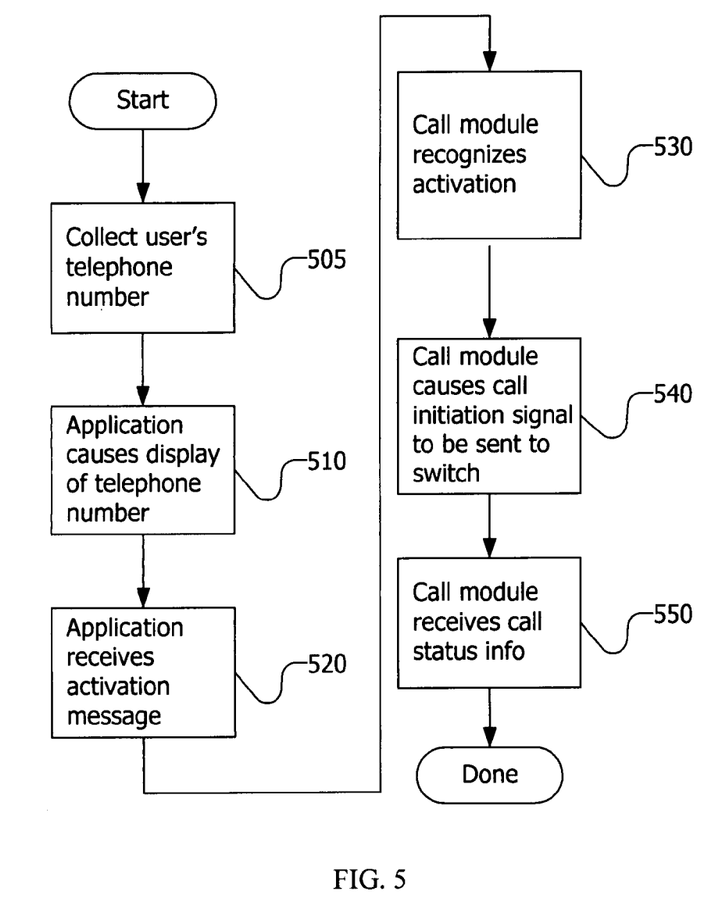
FIG. 5 is a flow chart of a method of application independent telephone call initiation using an object associated with a telephone number in accordance with the second aspect of the invention.

Referring now to FIG. 5, there is shown a flow chart of a method of application independent telephone call initiation by the server 130. The method of FIG. 5 is similar to the method of FIG. 4, and many aspects of the method of FIG. 4 apply to the method of FIG. 5.

In a preliminary step, the telephone call module 420 may collect a user's telephone number and service or billing authentication information (step 505). The telephone number and service or billing authentication information may be collected separately. The user may select any telephone number he wishes, such as the telephone 175 adjacent the client computer 100, a mobile telephone, a remote telephone or otherwise.

Next, the network application program 410 causes a telephone number or a name object to be displayed on the display 101 (step 510). The network application program 410 may do this, for example, by sending a message to the client computer 100, and the client computer 100 has a browser which displays the telephone number or a name object.

Next, the network application program 410 receives a message from the client computer 100 that the displayed telephone number or name object has been activated (step 520).

The telephone call module 420 recognizes the activation of the displayed telephone number or name object (step 530). Where activation is performed directly through the telephone call module 420, recognition may be inherent to the telephone call module 420. Alternatively, the telephone call module 420 may monitor the network application program 410 and/or the operating system 440 for activation of a phone number object.

Next, the telephone call module 420, in response to recognizing the activation of the displayed telephone number or name object, causes a call initiation signal to be sent to the switch 150 via the gateway 140 (step 540). The call initiation signal instructs the switch 150 to initiate a multi-leg telephone call with the predefined telephone number as one of the legs. Another leg is the activated telephone number. Prior to step 540, the telephone call module may send a message to the client computer to prompt the user to enter, confirm or modify the predefined telephone number.

The telephone call may connect the user's telephone 175 and one or more other telephones 170 via the PSN 160. The telephone call module 420 may initiate the call, for example, by calling a service of the operating system 430 or by working directly with the communications interface 440.

The telephone call module 420 sends a call initiation message for call initiation. The call initiation message may be an IP-based message for triggering call initiation. The telephone call module 420 may send the call initiation message directly to the switch 150, in which case the call initiation signal is the call initiation message. Alternatively, the telephone call module 420 may send the call initiation message to some other device (e.g., the server 130), which device then causes the call initiation signal to be sent to the switch 150.

In an embodiment where the call initiation message is sent to a server other than the server 130, the other server receives the call initiation message and may then transmit the call initiation signal to the switch 150 to trigger the call. The other server therefore may play an intermediary role. In this embodiment, a dedicated TCP connection may be opened to authenticate the user and start a call session with the other server. Using a messaging protocol, the other server communicates the call requests to the switch 150 or the gateway 140 to initiate the call. The TCP connection may be kept open during the entire period of the call before it is disconnected. Asynchronous call status messages may be processed as they arrive.

After the telephone call module 420 has signaled for call initiation, the telephone call module 420 may receive call status information from the switch 150 (step 550). The call status information may be, for example, "connected," "dropped," "busy" and "closed." The switch 150 may send the call status information directly to the telephone call module 420, or the telephone call module 420 may receive the call status information indirectly. The telephone call module 420 may cause the call status information to be provided to the client computer 100.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

The invention claimed is:

1. A method of application independent telephone call initiation comprising:

providing a computer having a display, an input device, an application program and a telephone call module,
the application program comprising an integrated body of computer software comprised of one or more files, modules or parts that calls operating system services and performs work for a user, and
the telephone call module comprising software distinct from the application program and operating apart from the application program;

the application program causing a telephone number to be displayed on the display;

the telephone call module recognizing user activation of the displayed telephone number;

the telephone call module, in response to recognizing the activation of the displayed telephone number, causing a first signal to be sent to a switch instructing the switch to initiate a telephone call between a predefined telephone number and the displayed telephone number;

the telephone call module recognizing user activation of a second telephone number; and the telephone call module, in response to recognizing the activation of the second telephone number, causing a second signal to be sent to the switch instructing the switch to initiate a conference call between the predefined telephone number, the displayed telephone number and the second telephone number wherein the first signal and the second signal are joined in a single message to the switch.

2. The method of application independent telephone call initiation of claim 1, wherein the causing the first signal to be sent includes transmitting the predefined telephone number and the displayed telephone number to the switch.

3. The method of application independent telephone call initiation of claim 1, further comprising:

the telephone call module receiving call status information from the switch; and the telephone call module causing the call status information to be provided to the user.

4. The method of application independent telephone call initiation of claim 3, wherein the step of the telephone call module causing the call status information to be provided to the user comprises displaying the call status information.

5. The method of application independent telephone call initiation of claim 3, wherein the call status information comprises a status selected from the group including connected, dropped, busy and closed.

6. The method of application independent telephone call initiation of claim 1 further comprising the telephone call module sending a call initiation message for causing the signal to be sent to the switch.

7. The method of application independent telephone call initiation of claim 6 wherein the telephone call module sends the call initiation message directly to the switch.

8. The method of application independent telephone call initiation of claim 6 wherein the telephone call module sends the call initiation message to a server, the sending further comprising opening a dedicated TCP connection to authenticate the user and start a call session with the server.

9. The method of application independent telephone call initiation of claim 6 wherein the call initiation message comprises one or more HTTP requests.

10. The method of application independent telephone call initiation of claim 6 wherein the call initiation message comprises one or more SIP messages sent on a data network.

11. A computer program product stored on a machine readable medium comprising computer software distinct from an application program and operating apart from the application program, the computer software having instructions for causing a processor to:
recognize activation by a user of a telephone number displayed by an application program;
in response to recognizing the activation of the displayed telephone number, cause a first signal to be sent to a switch instructing the switch to initiate a telephone call between a predefined telephone number and the displayed telephone number;
recognize activation of a second telephone number; and
in response to recognizing the activation of the second telephone number, cause a second signal to be sent to the switch instructing the switch to initiate a conference call between the predefined telephone number, the displayed telephone number and the second telephone number wherein the first signal and the second signal are joined in a single message to the switch.

12. The computer program product of claim 11 further comprising computer software having instructions for causing the processor to:
receive call status information from the switch; and
cause the call status information to be provided to the user.

13. The computer program product of claim 12, wherein the computer software having instructions to cause the call status information to be provided to the user comprises instructions to display the call status information.

14. The computer program product of claim 12, wherein the call status information comprises a status selected from the group including connected, dropped, busy and closed.

15. The computer program product of claim 11 further comprising computer software having instructions for causing the processor to send a call initiation message for causing the first signal to be sent to the switch.

16. The computer program product of claim 15 wherein the instructions for causing the processor to send the call initiation message comprise instructions for sending the call initiation message to the switch.

17. The computer program product of claim 15 wherein the instructions for causing the processor to send the call initiation message comprise instructions for causing the processor to:
open a dedicated TCP connection to authenticate the user;
start a call session with the server; and
send the call initiation message to the server.

18. The computer program product of claim 15 wherein the call initiation message comprises one or more HTTP requests.

19. The computer program product of claim 15 wherein the call initiation message comprises one or more SIP messages sent on a data network.

20. A general purpose computer comprising the computer program product of claim 11, the application program, a display for displaying the telephone number, a user input device for receiving the activation, and a communications interface for sending the first and second signals to the switch.

21. The computer program product of claim 11 wherein the computer software comprises a second application program.

22. The computer program product of claim 11 wherein the computer software comprises a dynamic linked library.

23. A client computer for application independent telephone call initiation comprising:
a user input device;
a display device;
a processor; and
a memory;
wherein the processor and the memory comprise circuits and software for:
recognizing activation by a user of a telephone number displayed by an application program, and
in response to recognizing the activation of the displayed telephone number, causing a first signal to be sent to a switch instructing the switch to initiate a telephone call between a predefined telephone number and the displayed telephone number;
recognizing activation of a second telephone number; and
in response to recognizing the activation of the second telephone number, causing a second signal to be sent to the switch instructing the switch to initiate a conference call between the predefined telephone number, the displayed telephone number and the second telephone number wherein the first signal and the second signal are joined in a single message to the switch.

24. The client computer for application independent telephone call initiation of claim 23 wherein the processor and the memory further comprise circuits and software for:
receiving call status information from the switch; and
causing the call status information to be provided to the user.

25. The client computer for application independent telephone call initiation of claim 24, wherein the processor and the memory further comprise circuits and software for displaying the call status information.

26. The client computer for application independent telephone call initiation of claim 24, wherein the call status information comprises a status selected from the group including connected, dropped, busy and closed.

27. The client computer for application independent telephone call initiation of claim 23 wherein the processor and the memory further comprise circuits and software for sending a call initiation message for causing the signal to be sent to the switch.

28. The client computer for application independent telephone call initiation of claim 27 wherein the processor and the memory further comprise circuits and software for sending the call initiation message to the switch.

29. The client computer for application independent telephone call initiation of claim 27 wherein the processor and the memory further comprise circuits and software for:
opening a dedicated TCP connection to authenticate the user;
starting a call session with the server; and
sending the call initiation message to the server.

30. The client computer for application independent telephone call initiation of claim 27 wherein the call initiation message comprises one or more HTTP requests.

31. The client computer for application independent telephone call initiation of claim 27 wherein the call initiation message comprises one or more SIP messages sent on a data network.

32. The client computer for application independent telephone call initiation of claim 23 wherein the software comprises an application program and a telephone call module distinct from the application program.

33. A method of server-based telephone call initiation comprising:
providing a server having a network application program and a telephone call module;

the application program sending a first message to a client computer for causing a first telephone number to be displayed by the client computer;

the application program receiving a second message from the client computer that the displayed telephone number has been activated;

the telephone call module, in response to receiving the second message, causing a first signal to be sent to a switch instructing the switch to initiate a telephone call between a second, predefined telephone number and the first telephone number;

the telephone call module receiving a third message from the client computer that a third telephone number has been activated; and the telephone call module, in response to receiving the third message that the third telephone number has been activated, causing a second signal to be sent to the switch instructing the switch to initiate a conference call between the first telephone number, the second telephone number and the third telephone number wherein the first signal and the second signal are joined in a single message to the switch.

34. The method of server-based telephone call initiation of claim 33, wherein the causing the first signal to be sent includes transmitting the first telephone number and the second telephone number to the switch.

35. The method of server-based telephone call initiation of claim 33 further comprising:

the telephone call module receiving call status information from the switch; and the telephone call module sending the call status information to the client computer.

36. The method of server-based telephone call initiation of claim 33 further comprising the telephone call module sending a call initiation message for causing the first signal to be sent to the switch.

37. The method of server-based telephone call initiation of claim 36 wherein the telephone call module sends the call initiation message directly to the switch.

38. The method of server-based telephone call initiation of claim 36 wherein the telephone call module sends the call initiation message to another server.

39. The method of server-based telephone call initiation of claim 36 wherein the call initiation message comprises one or more HTTP requests.

40. The method of server-based telephone call initiation of claim 36 wherein the call initiation message comprises one or more SIP messages sent on a data network.

41. A computer program product stored on a machine readable medium comprising computer software having instructions for causing a processor to:

send a message to a client computer for causing a first telephone number to be displayed by the client computer;

receive a message from the client computer that the displayed telephone number has been activated;

in response to receiving the message from the client computer, cause a first signal to be sent to a switch instructing the switch to initiate a telephone call between a second, predefined telephone number and the first telephone number;

receive a message from the client computer that a third telephone number has been activated; and in response to receiving the message that the third telephone number has been activated, cause a second signal to be sent to the switch instructing the switch to initiate a conference call between the first telephone number, the second telephone number and the third telephone number wherein the first signal and the second signal are joined in a single message to the switch.

42. The computer program product of claim 41, wherein the instructions for causing the processor to cause include instructions for causing the processor to transmit the first telephone number and the second telephone number to the switch.

43. The computer program product of claim 41 further comprising instructions for causing the processor to:

receive call status information from the switch; and send the call status information to the client computer.

44. The computer program product of claim 41 further comprising instructions for causing the processor to send a call initiation message for causing the first signal to be sent to the switch.

45. The computer program product of claim 44 wherein the call initiation message is sent directly to the switch.

46. The computer program product of claim 44 wherein the call initiation message is sent to a server.

47. The computer program product of claim 44 wherein the call initiation message comprises one or more HTTP requests.

48. The computer program product of claim 44 wherein the call initiation message comprises one or more SIP messages sent on a data network.

* * * * *